US011876443B2

(12) United States Patent
Huang et al.

(10) Patent No.: US 11,876,443 B2
(45) Date of Patent: Jan. 16, 2024

(54) HYBRID SWITCHED-CAPACITOR CONVERTER

(71) Applicant: Nuvoton Technology Corporation, Hsinchu Science Park (TW)

(72) Inventors: Po-Hsun Huang, Tainan (TW); Wei-Chan Hsu, Cupertino, CA (US)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 140 days.

(21) Appl. No.: 17/552,460

(22) Filed: Dec. 16, 2021

(65) Prior Publication Data

US 2022/0321001 A1 Oct. 6, 2022

(30) Foreign Application Priority Data

Mar. 31, 2021 (TW) .................................. 110111779

(51) Int. Cl.
*H02M 3/07* (2006.01)
*H02M 3/158* (2006.01)
*H02M 1/00* (2006.01)

(52) U.S. Cl.
CPC ............. *H02M 3/07* (2013.01); *H02M 1/007* (2021.05); *H02M 1/0095* (2021.05); *H02M 3/158* (2013.01)

(58) Field of Classification Search
CPC ...... H02M 1/007; H02M 1/0067; H02M 3/07; H02M 3/158; H02M 1/0095
See application file for complete search history.

(56) References Cited

U.S. PATENT DOCUMENTS

| 10,084,384 | B1* | 9/2018 | Kotikalapoodi | ...... H02M 3/158 |
| 2009/0278520 | A1* | 11/2009 | Perreault | ................. H02M 3/07 323/282 |

(Continued)

FOREIGN PATENT DOCUMENTS

| CN | 106712503 A | 5/2017 |
| CN | 111181384 A | 5/2020 |

(Continued)

OTHER PUBLICATIONS

Office Action dated Jan. 5, 2022 in TW Application No. 110111779 is attached, 6 pages.

*Primary Examiner* — Alex Torres-Rivera
(74) *Attorney, Agent, or Firm* — MUNCY, GEISSLER, OLDS & LOWE, PC

(57) ABSTRACT

A power converter is provided. The power converter includes a switched-capacitor conversion circuit and an inductor buck circuit. The switched-capacitor conversion circuit receives an input voltage at an input terminal and performs a switching operation to convert the input voltage to an intermediate voltage. The inductor buck circuit is coupled to an output terminal of the switched-capacitor conversion circuit to receive the intermediate voltage and operates at a constant on-time to generate an output voltage at a conversion output terminal according to the intermediate voltage. The inductor buck circuit includes an inductor. In response to that a state of an inductor current used for charging the inductor corresponds to a predetermined condition, a switching action of the switching operation is enabled, so that the switched-capacitor conversion circuit is switched from a first turned-on state to a second turned-on state.

10 Claims, 5 Drawing Sheets

(56) References Cited

U.S. PATENT DOCUMENTS

| | | |
|---|---|---|
| 2011/0169474 A1 | 7/2011 | Cuk |
| 2011/0175591 A1 | 7/2011 | Cuk |
| 2011/0316508 A1 | 12/2011 | Cheng et al. |
| 2020/0204071 A1* | 6/2020 | Huang .................... H02M 3/07 |
| 2022/0278611 A1* | 9/2022 | Tsuda ..................... H02M 3/01 |
| 2022/0302826 A1* | 9/2022 | Matei .................... H02M 3/158 |

FOREIGN PATENT DOCUMENTS

| | | |
|---|---|---|
| EP | 2997432 B1 | 1/2020 |
| TW | 201613240 A | 4/2016 |
| TW | 201937329 A | 9/2019 |
| TW | 202022526 A | 6/2020 |
| WO | WO-2017195592 A1 | 11/2017 |
| WO | WO-2019050907 A1 | 3/2019 |
| WO | WO-2019188029 A1 | 10/2019 |

* cited by examiner

HYBRID SWITCHED-CAPACITOR CONVERTER

CROSS REFERENCE TO RELATED APPLICATIONS

This Application claims priority of Taiwan Patent Application No. 110111779 filed on Mar. 31, 2021, the entirety of which is incorporated by reference herein.

BACKGROUND OF THE INVENTION

Field of the Invention

The present invention relates to a power converter, and more particularly to a hybrid power converter using constant on-time control.

Description of the Related Art

For a conventional buck converter, when its voltage conversion rate is greater, it is difficult to achieve higher efficiency because the voltage stress at the output terminal is greater relative to the input terminal. Thus, a hybrid switched-capacitor converter, which comprises a first-stage switched-capacitor converter and a second-stage buck converter, was proposed. Compared with the conventional buck converter, the switched-capacitor converter has better efficiency in the cases where there is a larger voltage step. However, the hybrid switched-capacitor converter requires more control circuits to switch the switches in the switched-capacitor converter and the buck converter, which leads to an increased quiescent current. Since the efficiency of the converter mainly depends on the amount of quiescent current which is consumed when the output current is close to zero volt, the above-mentioned increase in the quiescent current results in poor efficiency in cases of light load or ultra-light load.

BRIEF SUMMARY OF THE INVENTION

An exemplary embodiment of the present invention provides a power converter. The power converter comprises a switched-capacitor conversion circuit and an inductor buck circuit. The switched-capacitor conversion circuit receives an input voltage at an input terminal and performs a switching operation to convert the input voltage into an intermediate voltage. The inductor buck circuit is coupled to an output terminal of the switched-capacitor conversion circuit to receive the intermediate voltage. The inductor buck circuit operates under a constant on-time to generate an output voltage at a conversion output terminal according to the intermediate voltage. The inductor buck circuit comprises an inductor. In response to that a state of an inductor current used for charging the inductor corresponds to a predetermined condition, a switching action of the switching operation is enabled, so that the switched-capacitor conversion circuit is switched from a first turned-on state to a second turned-on state.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated model of carrying out the invention. This description is made for the purpose of illustrating the general principles of the invention and should not be taken in a limiting sense. The scope of the invention is best determined by reference to the appended claims.

Figure 1:
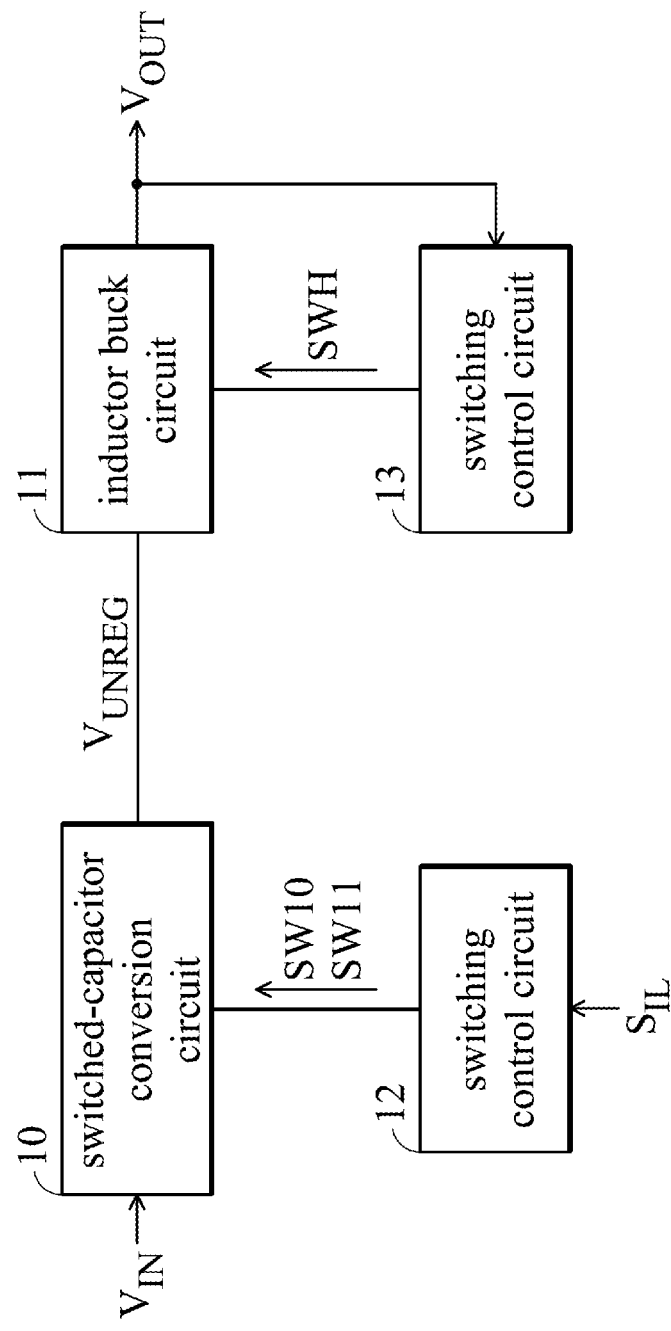
FIG. 1 shows a power converter according to an embodiment of the present invention.

FIG. 1 shows a power converter according to an exemplary embodiment of the present invention. Referring to FIG. 1, the power converter 1 is a hybrid power converter, which comprises a first-stage switched-capacitor conversion circuit 10 and a second-stage inductor buck circuit 11, and further comprises switching control circuits 12 and 13. The switching control circuit 12 generates switching signals SW10 and SW11, and the switching control circuit 13 generates switching signal SWH. The switched-capacitor conversion circuit 10 receives an input voltage $V_{IN}$, and further receives the switching signals SW10 and SW11. The switched-capacitor conversion circuit 10 performs a switching operation according to the switching signals SW10 and SW11 to convert the input voltage $V_{IN}$ into an intermediate voltage $V_{UNREG}$. The inductor buck circuit 11 is coupled to the switched-capacitor conversion circuit 10 to receive the intermediate voltage $V_{UNREG}$. The inductor buck circuit 11 operates under a constant on-time (COT) to convert the intermediate voltage $V_{UNREG}$ into an output voltage $V_{OUT}$.

In the embodiment, the switching control circuit 12 receives a current state signal $S_{IL}$, which is associated with a state of an inductor current $I_L$ charging an inductor in the inductor buck circuit 11. The switching control circuit 12 determines whether the inductor current $I_L$ corresponds to or meets a predetermined condition according to the current state signal $S_{IL}$. When the switching control circuit 12 determines that the inductor current corresponds to or meets the aforementioned predetermined condition, the switching control circuit 12 changes the levels of the switching signals SW10 and SW11 to enable a switching action of the switching operation of the switched-capacitor conversion circuit 10. The switching control circuit 13 provides a constant time (COT) period and generates the switching signal SWH according to the constant time period. In addition, the switching control circuit 13 further determines whether to restart the constant time period according to the magnitude of the output voltage $V_{OUT}$.

In the following paragraphs, the circuit structures and operations of the switched-capacitor conversion circuit 10, the inductor buck circuit 11, and the switching control circuits 12 and 13 will be described in detail.

Figure 2:
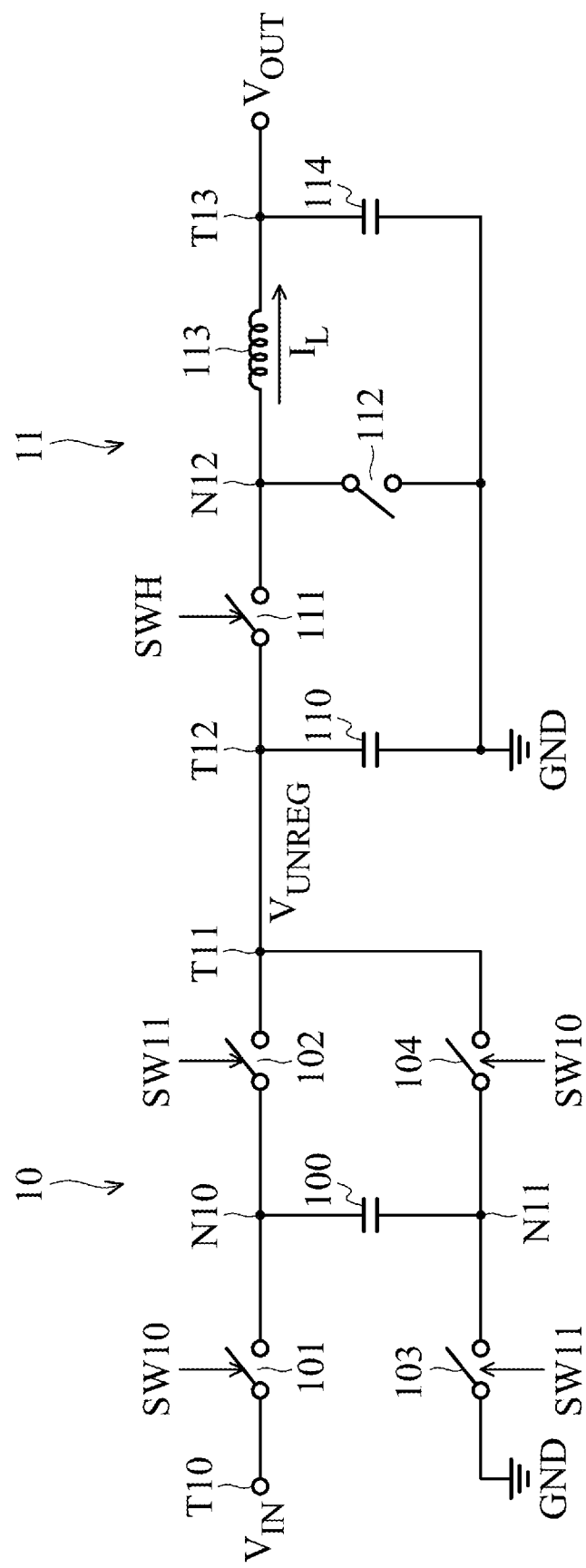
FIG. 2 shows a circuit diagram of a switched-capacitor conversion circuit and an inductor buck circuit according to an embodiment of the present invention.

FIG. 2 is a circuit diagram of a switched-capacitor conversion circuit 10 and an inductor buck circuit 11 according to an exemplary embodiment of the present invention. Referring to FIG. 2, an input terminal T10 of the switched-capacitor conversion circuit 10 receives the input voltage $V_{IN}$, and the inductor buck circuit 11 is serially connected to an output terminal T11 of the switched-capacitor conversion circuit 10. The switched-capacitor conversion circuit 10 comprises two switch sets and a capacitor. One switch set and the capacitor are connected in series between the input terminal T10 and the output terminal T11, and the other switch set and the capacitor are connected in series between the ground terminal GND and the output terminal T11. The states (turned-on or turned-off states) of the two switch sets of the switched-capacitor conversion circuit 10 are controlled by two different switching signals, so that the two switch sets can be turned on alternately to accomplish the switching operation, thereby converting the input voltage $V_{IN}$ into the intermediate voltage $V_{UNREG}$. In the embodiment, the switching operation is achieved by a plurality of switching actions, wherein every change in the states of the two switch sets corresponds to a switching action. Hereinafter, an example will be used to illustrate the circuit structure and operation of the switched-capacitor conversion circuit 10. Referring to FIG. 2, the switched-capacitor conversion circuit 10 comprises switches 101~104 and a capacitor 100, wherein a first switch group is composed of the switches 101 and 104, and a second switch group of composed of the switches 102 and 103. The switch 101 is coupled between the input terminal T10 and a node N10, the switch 102 is coupled between the node N10 and the output terminal T11, the switch 103 is coupled between the ground terminal GND and a node N11, and the switch 104 is coupled between the node N11 and the output terminals T11. The capacitor 100 is coupled between the node N10 and the node N11. According to the above-mentioned connection structure of the switches 101~104 and the capacitor 100, the capacitor 100 and the first switch group composed of the switches 101 and 104 are connected in series between the input terminal T10 and the output terminal T11, and the capacitor 100 and the second switch group composed of the switches 102 and 103 are connected in series between the ground terminal GND and the output terminal T11. The switches 101 and 104 of the first switch group are controlled by the same switching signal SW10 to switch between a turned-on state and a turned-off state. The switches 102 and 103 of the second switch group are controlled by the same switching signal SW11 to switch between a turned-on state and a turned-off state. In the embodiment, the switching signals SW10 and SW11 are generated by the switching control circuit 12 according to the current state signal $S_{IL}$. Based on the timing of the switching signals SW10 and SW11, the period when the switches 101 and 104 are turned on and the period when the switches 102 and 103 are turned on do not overlap with each other. In one embodiment, the switching signals SW10 and SW11 have the same frequency, but the phases of the switching signals SW10 and SW11 are opposite to each other. In this way, the switches 101 and 104 can be turned on at the same time, and the switches 102 and 103 can be turned on at the same time, but the situation that the switches 101 and 104 are not be turned on does not occur at the same time as the situation that the switches 102 and 103 are turned on. In the embodiment, the timing of switching the levels of the switching signals SW10 and SW11 is determined according to the current state signal $S_{IL}$. In other words, the time when each switching action of the switching operation is enabled is determined according to the current state signal $S_{IL}$, so that the switched-capacitor conversion circuit 10 switches from a first turned-on state to a second turned-on state. In an embodiment, in the first turned-on state of the switched-capacitor conversion circuit 10, one of the first switch group (the switches 101 and 104) or the second switch group (the switches 102 and 103) is turned on and the other thereof is turned off, and the second turned-on state is opposite to the first turned-on state. For example, in the first turned-on state of the switched-capacitor conversion circuit 10, the first switch group (the switches 101 and 104) is turned on while the second switch group (the switches 102 and 103) is turned off, and in the second turned-on state, the first switch group (the switches 101 and 104) is turned off while the second switch group (the switches 102 and 103) is turned on. In this example, it is assumed that the switched-capacitor conversion circuit 10 is in the first turned-on state. When a switching action is enabled according to the current state signal $S_{IL}$, the first switch group (the switches 101 and 104) is switched from the turned-on state to the turned-off state, and the second switch group (the switches 102 and 103) is switched from the turned-off state to the turned-on state, that is, the switched-capacitor conversion circuit 10 is switched to the second turned-on state. Conversely, it is assumed that the switched-capacitor conversion circuit 10 is in the second turned-on state. When a switching action is enabled according to the current state signal $S_{IL}$, the first switch group (the switches 101 and 104) is switched from the turned-off state to the turned-on state, and the second switch group (the switches 102 and 103) is switched from the turned-on state to the turned-off state, that is, the switched-capacitor conversion circuit 10 is switched to the first turned-on state. Through a plurality of switching actions corresponding to the changes in the states of the switches 101~104, the switched-capacitor conversion circuit 10 performs the switching operation to convert the input voltage $V_{IN}$ into the intermediate voltage $V_{UNREG}$ on the output terminal T10.

Referring to FIG. 2, an input terminal T12 of the inductor buck circuit 11 is connected to the output terminal T11 of the switched-capacitor conversion circuit 10, so that the inductor buck circuit 11 and the switched-capacitor conversion circuit 10 are connected in series. The inductor buck circuit 11 comprises an input capacitor 110, a high-side switch 111, a low-side switch 112, an inductor 113, and an output capacitor 114. The input capacitor 110 is coupled between the input terminal T12 and the ground terminal GND and charged by the intermediate voltage $V_{UNREG}$. The high-side switch 111 is coupled between the input terminal T12 and a node N12. The low-side switch 112 is coupled between the node N12 and the ground terminal GND. The inductor 113 is coupled between the node N12 and a conversion output terminal T13. The output capacitor 114 is coupled between the conversion output terminal T13 and the ground terminal GND. The high-side switch 111 is controlled by the switching signal SWH to switch between a turned-on state and a turned-off state. In detail, whenever an enabling pulse occur on the switching signal SWH, the high-side switch 111 is turned on. The control terminal of the low-side switch 112 is coupled to the ground terminal GND. In the embodiment, the switching signal SWH is generated by the switching control circuit 13. Through the switching of the state of the high-side switch 111, the inductor buck circuit 11 generates an output voltage $V_{OUT}$ on the conversion output terminal T13 according to the intermediate voltage $V_{UNREG}$.

Figure 3:
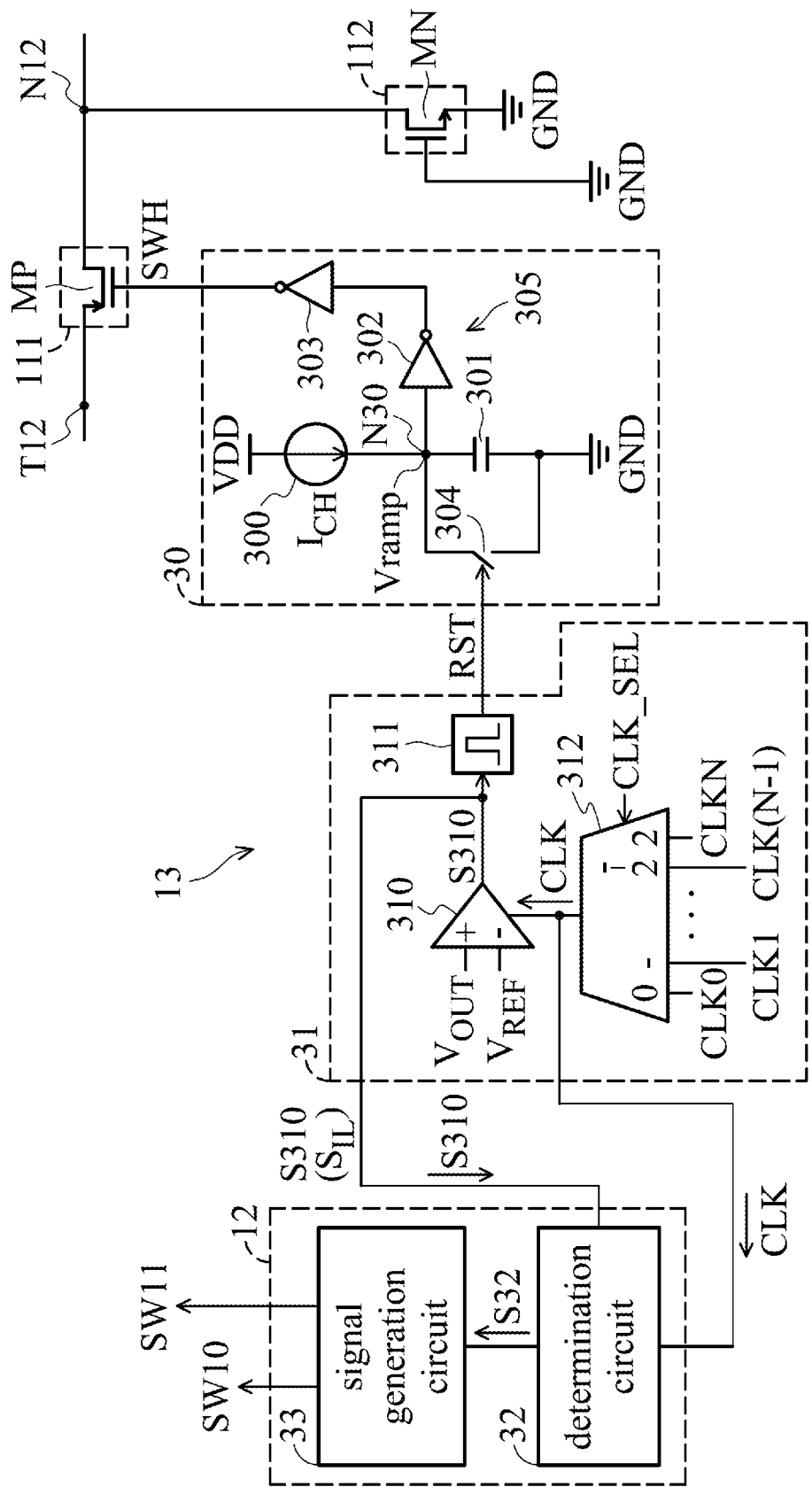
FIG. 3 shows switching control circuits of a power converter according to an embodiment of the present invention.

FIG. 3 shows the switching control circuits 12 and 13 according to an embodiment of the present invention. In order to describe the operation of the switching control circuits 12 and 13 in detail, FIG. 3 also shows the high-side switch 111 and the low-side switch 113. In the embodiment of FIG. 3, the high-side switch 111 is implemented by a P-type metal-oxide-semiconductor (PMOS) transistor MP, and the low-side switch 112 is implemented by an N-type metal oxide semiconductor (NMOS) transistor MN. The source of the PMOS transistor MP is coupled to the input terminal T12, and the drain thereof is coupled to the node N12. The drain of the NMOS transistor MN is coupled to the node N12, and the source thereof is coupled to the ground terminal GND. Moreover, the gate of the NMOS transistor MN serves as the control terminal of the low-side switch 112. Referring to FIG. 3, the gate of the NMOS transistor MN is coupled to the ground terminal GND.

Referring to FIG. 3, the switching control circuit 13 comprises a constant on-time (COT) control circuit 30 and a reset circuit 31. The COT control circuit 30 comprises a current source 300, a capacitor 301, a buffer circuit 305, and a switch 304. The current source 300 is coupled between the operation voltage VDD of the power converter 1 and the node N30 and provides a charging current $I_{CH}$. The capacitor 301 is coupled between a node N30 and the ground terminal GND. The buffer circuit 305 has an input terminal coupled to the node N30 to receive a ramp voltage Vramp and an output terminal for generating the switching signal SWH. In the embodiment, the buffer circuit 305 is implemented by inverters 302 and 303. An input terminal of the inverter 302 is coupled to the node N30. An input terminal of the inverter 303 is coupled to an output terminal of the inverter 302, and an output terminal thereof is coupled to the gate of the PMOS transistor MP, however, the present invention is not limited thereto. The switching signal SWH is generated at the output terminal of the inverter 303. The switch 304 is coupled between the node N30 and the ground terminal GND and controlled by a reset signal RST.

The reset circuit 31 comprises a latch-type comparator 310, a pulse generator 311, and a multiplexer 312. A positive input terminal (+) of the latch-type comparator 310 receives the output voltage $V_{OUT}$, and the negative input terminal (−) thereof receives a reference voltage $V_{REF}$. The latch-type comparator 310 compares the output voltage $V_{OUT}$ with the reference voltage $V_{REF}$ based on a clock signal CLK, and generates a comparison result signal S310 according to the comparison result. When the output voltage $V_{OUT}$ is less than the reference voltage $V_{REF}$, a single pulse occurs on the comparison result signal S310. The pulse generator 311 is coupled to the latch-type comparator 310 to receive the comparison result signal S310. The pulse generator 311 generates the reset signal RST according to the comparison result signal S310. Whenever a single pulse occurs on the comparison result signal S310, a single pulse occurs on the reset signal RS to turn on the switch 304.

In the embodiment, the clock signal CLK is provided by the multiplexer 312. Referring to FIG. 3, N input terminals of the multiplexer 312 respectively receive a plurality of input clock signals CLK0~CLKN. The multiplexer 312 selects one of the input clock signals CLK0~CLKN as the clock signal CLK according to a selection signal CLK_SEL. The input clock signals CLK0~CLKN have different frequencies. For example, the frequencies of the input clock signals CLK0~CLKN decrease sequentially. In one embodiment, the multiplexer 312 selects one of the input clock signals CLK0~CLKN as the clock signal CLK according to the load current flowing through the load of the power converter 1. In detail, the value of the selection signal CLK_SEL indicates the magnitude of the load current flowing through the load of the power converter 1, and the multiplexer 312 selects one of the input clock signals CLK0~CLKN as the clock signal CLK according to the value of the selection signal CLK_SEL.

In an embodiment, the input clock signals CLK0~CLKN are associated with the system clock of the device where the power converter 1 is configured. For example, the frequency of the input clock signal CLK0 is the same as the frequency of the system clock, and there is a multiple relationship between the frequency of the system clock and the frequency of each of the input clock signals CLK1~CLKN. The multiples of the frequency of the system clock respectively to the frequencies of the input clock signals CLK1~CLKN are different from each other.

Figure 4A:
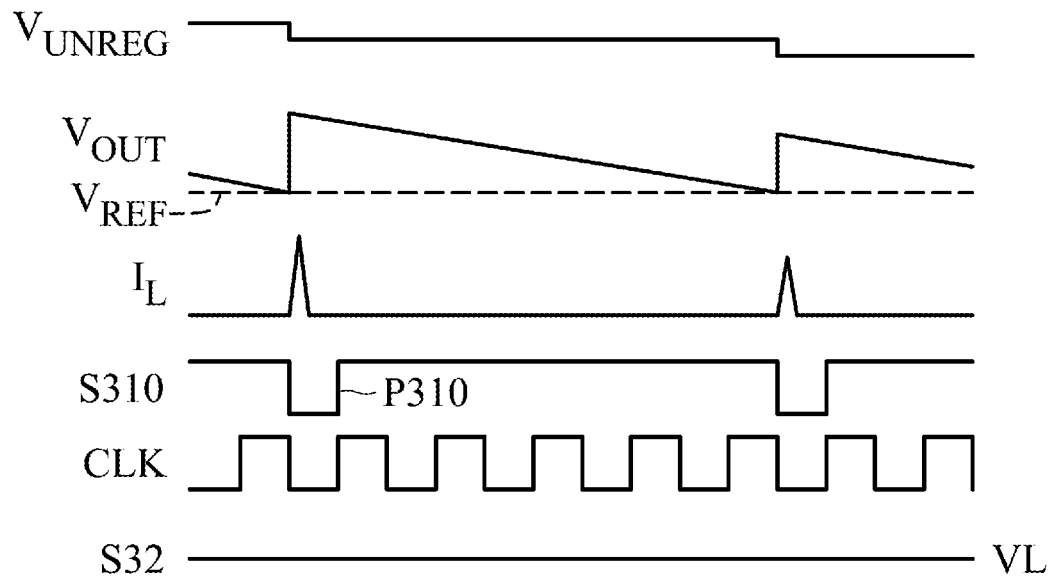
FIGS. 4A and 4B show timing diagrams of main signals and voltages of a power converter according to an embodiment of the present invention.

The operation of the switching control circuit 13 will be described below with reference to FIGS. 3 and 4A.

Referring to FIG. 3, when the switch 304 is turned off according to the reset signal RST, the charging current $I_{CH}$ of the current source 300 charges the capacitor 301. Therefore, the ramp voltage Vramp on the node N30 gradually rises from the voltage level of the ground terminal GND. When the ramp voltage Vramp is not higher than the threshold voltage of the inverter 302, the switching signal SWH generated by the inverter 303 is at a low voltage level through the operations of the inverters 302 and 303 to turn on the PMOS transistor MP. Referring to FIG. 4A, since the PMOS transistor MP is turned on, a peak occurs on the inductor current $I_L$. In response to the peak of the inductor current $I_L$, the output voltage $V_{OUT}$ increases instantly, and the intermediate voltage $V_{UNREG}$ decreases. Once the ramp voltage Vramp is higher than the threshold voltage of the inverter 302, the switching signal SWH generated by the inverter 303 is at a high voltage level through the operation of the inverters 302 and 303 to turn off the PMOS transistor MP, and the inductor current $I_L$ flows through the body diode of the NMOS transistor MN. Since the load of the power converter 1 draws a current from the output terminal T13, the output voltage $V_{OUT}$ starts decreasing gradually after the output voltage $V_{OUT}$ increases instantly. In the embodiment, the current source 300 is a constant current source which provides a constant charging current $I_{CH}$. Due to the charging to the capacitor 301 by the constant current source 300 and the threshold voltage of the inverter 302, the time when the PMOS transistor MP is turned on remains constant. Therefore, the inductor buck circuit 11 is controlled by the COT control circuit 30 to operate under a constant on-time.

In the embodiment of the present invention, the latch-type comparator 310 compares the output voltage $V_{OUT}$ with the reference voltage $V_{REF}$ when a falling edge of the clock signal CLK occurs. Referring to FIG. 4A, during the gradual decrease in the output voltage $V_{OUT}$, when the output voltage $V_{OUT}$ is greater than the reference voltage $V_{REF}$, the comparison result signal S310 is at a high voltage level. When the output voltage $V_{OUT}$ gradually decreases and then becomes lower than the reference voltage $V_{REF}$, the comparison result signal S310 switches to a low voltage level from the high voltage level, that is, the comparison result signal S310 has a falling edge. As shown in FIG. 4A, one falling edge of the comparison result signal s310 is aligned with one falling edge of the clock signal CLK, and when a successive rising edge occurs on the clock signal CLK, the comparison result signal S310 returns to the high voltage level, that is, the comparison result signal S310 has a rising edge. According to the above description, once the output voltage $V_{OUT}$ is lower than the reference voltage $V_{REF}$, a single pulse P310 with a constant time occurs on the comparison result signal S310, and the constant time is equal to half of the period of the clock signal CLK.

When a single pulse P310 occurs on the comparison result signal S310, the pulse generator 311 generates a single pulse on the reset signal RST according to the pulse P310 to turn on the switch 304 during the single pulse, thereby resetting the COT control circuit 31. At this time, the capacitor 301 is discharged through the turned-on switch 304, and therefore, the ramp signal Vramp drops to the voltage level of the ground terminal GND. As the single pulse on the reset signal RST disappears, the switch 304 switches to the turned-off state from the turned-on state. The current source 300 starts charging the capacitor 301 with the charging current $I_{CH}$, and the ramp voltage Vramp starts increasing gradually from the voltage level of the ground terminal GND. After that, the operation of the COT control circuit 30 is as described above and will not be repeated here. In the above operation, the time interval during which the COT control circuit 31 is reset twice is called as a COT cycle. In other words, whenever the COT control circuit 31 is reset, the COT cycle is restarted, and the constant current source 300 starts charging the capacitor 301.

Figure 4B:
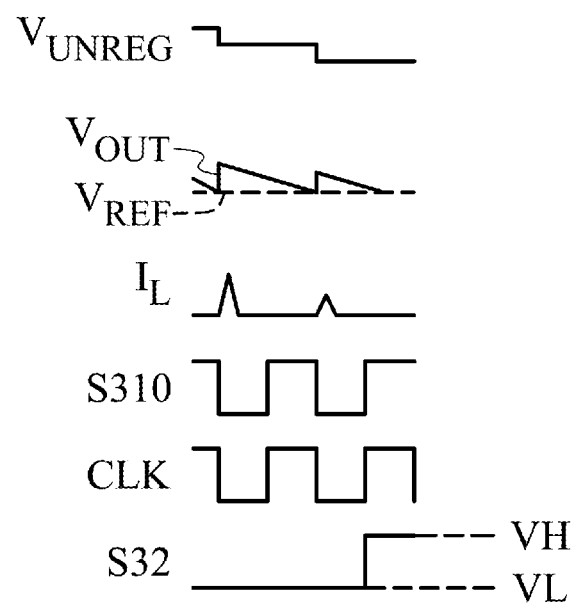

According to the above description, once the output voltage $V_{OUT}$ is lower than the reference voltage $V_{REF}$, a single pulse P310 occurs on the comparison result signal S310. In response to a single pulse P310 of the comparison result signal S310, the COT control circuit 31 is reset, a peak occurs on the inductor current $I_L$, and the output voltage $V_{OUT}$ increases instantly. After the output voltage $V_{OUT}$ increases instantly, the output voltage $V_{OUT}$ starts decreasing gradually. When the output voltage $V_{OUT}$ is lower than the reference voltage $V_{REF}$ again, the comparison result signal S310 generates a next single pulse P310. Referring to FIG. 4A, the intermediate voltage $V_{UNREG}$ drops once every time a peak of the inductor current $I_L$ occurs. Therefore, the values of the peaks of the inductor current $I_L$ become smaller with time, and the maximum value of the output voltage $V_{OUT}$ occurring when the output voltage $V_{OUT}$ increases instantly also becomes smaller with time. At this time, the COT period of the COT control circuit 31 is getting shorter, and the switch 111 in the switching capacitor conversion circuit 10 is switched faster, as shown in FIG. 4B, so as to maintain the driving capability of the power converter 1. However, the cases where several pulses P310 of the comparison result signal S310 appear within a predetermined time indicate that the value of the peak of the inductor current $I_L$ is excessively too small, which results in insufficient driving capability of the power converter 1. In these cases, it is necessary to enable the switching actions of the switched-capacitor conversion circuit 10 10 to increase the intermediate voltage $V_{UNREG}$, so as to restore the driving capability of the power converter 1.

In the embodiment, the change in the voltage level of the comparison result signal S310 occurs in response to the output voltage $V_{OUT}$. When a single pulse P310 occurs on the comparison result signal S310 to reset the COT control circuit 30, the inductor current $I_L$ has a peak value. Therefore, the comparison result signal S310 can indicate the state of the inductor current IL. In detail, a single pulse P310 of the comparison result signal S310 indicates that a peak occurs on the inductor current $I_L$. Therefore, the number of single pulses P310 of the comparison result signal S310 is equal to the number of peaks of the inductor current $I_L$ within a predetermined time. In this way, the comparison result signal S310 can represent the number of peaks of the inductor current k occurring within the predetermined time. According to the above description, as the values of the peaks of the inductor current $I_L$ become smaller, the number of single pulses P310 of the comparison result signal S310 within the predetermined time increases.

In another embodiment, the switch 112 (implemented by an NMOS transistor MN) can be controlled by an inductor-current detection signal and the switching signal SWH instead. The inductor-current detection signal indicates whether the inductor current $I_L$ is zero. When the switching signal SWH is at the low voltage level, the NMOS transistor MN is turned off, and the inductor current $I_L$ rises; when the switching signal SWH is at the high voltage level, the NMOS transistor MN is turned on, and the inductor current $I_L$ decreases; when the inductor current $I_L$ drops to zero, the inductor-current detection signal turns off the NMOS transistor MN again.

The operation of the switching control circuit 12 will be described below with reference to FIGS. 3 and 4A-4B.

The switching control circuit 12 comprises a determination circuit 32 and a signal generation circuit 33. The determination circuit 32 receives the current state signal $S_{IL}$ and the clock signal CLK and further generates a control signal S32. The signal generation circuit 33 generates the switching signals SW10 and SW11 and determines whether the voltage levels of the switching signals SW10 and SW11 need to be changed according to the control signal S32 to enable a switching action of the switched-capacitor conversion circuit 10. According to the above description, the comparison result signal S310 can indicate the state of the inductor current $I_L$. Therefore, in the embodiment, the determination circuit 32 of the switching control circuit 12 receives the comparison result signal S310 as the current state signal $S_{IL}$. The determination circuit 32 calculates the number of peaks occurring on the inductor current $I_L$ within a predetermined time to generate a count value and determines whether the obtained count value is greater than a predetermined number. In the embodiment, the aforementioned predetermined condition indicates that the count value (representing the number of peaks occurring on the inductor current $I_L$ within the predetermined time) is greater than the predetermined number. The determination circuit 32 generates the control signal S32 according to the determination result. In the embodiment, the predetermined period is two cycles of the clock signal CLK, and the predetermined number is 2. In one case, as shown in FIG. 4A, when the determination circuit 32 determines that the count value obtained through the above calculation within two cycles of the clock signal CLK is not greater than the predetermined number (for example, 2), the control signal S32 with a voltage level VL is generated. At this time, the signal generation circuit 33 maintains the voltage levels of the switching signals SW10 and SW11, that is the voltage level of the switching signals SW10 and SW11 are not changed. In another case, as shown in FIG. 4B, when the determination circuit 32 determines that the count value obtained through the above calculation within two cycles of the clock signal CLK is greater than the predetermined number (for example, 2) (that is, the inductor current The state of the inductor current $I_L$ corresponds to the predetermined condition), and a control signal S32 with a high voltage level VH is generated. At this time, the signal generation circuit 33 changes the voltage levels of the switching signals SW10 and SW11 to enable a switching action of the switched-capacitor conversion circuit 10.

According to the above description, when the values of the peaks of the inductor current $I_L$ are excessively small, the driving capability of the power converter 1 is insufficient. In response to this situation, it is necessary to enable a switching action of the switched-capacitor conversion circuit 10 to increase the intermediate voltage $V_{UNREG}$, so as to restore the driving capability of the power converter 1. Therefore, in some embodiments, whether to enable a switching action of the switched-capacitor conversion circuit 10 can be determined according to the magnitude of the inductor current $I_L$.

Figure 5:
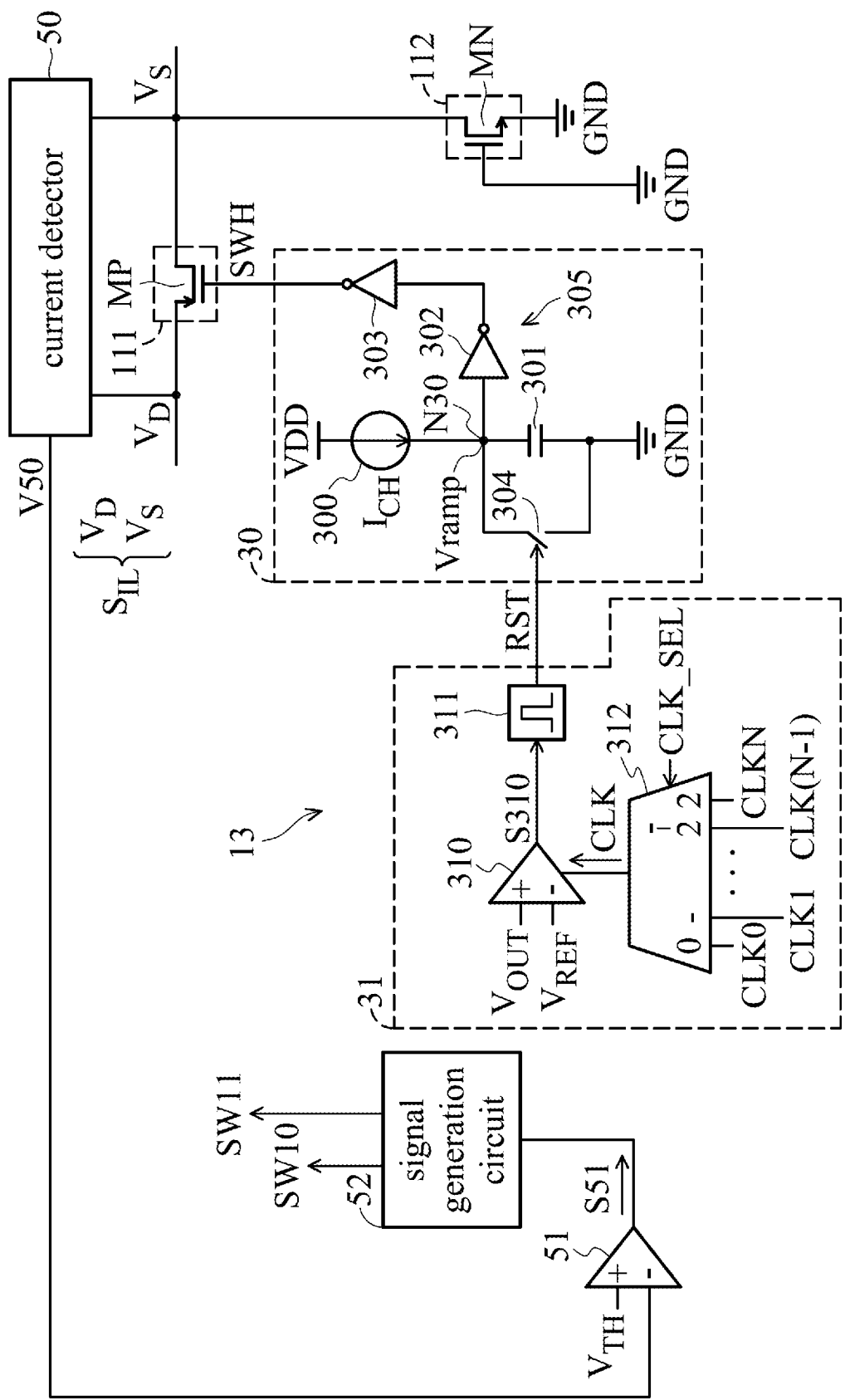
FIG. 5 shows a switching control circuit of a power converter according to another embodiment of the present invention.

FIG. 5 shows the switching control circuits 12 and 13 according to another embodiment of the present invention. Referring to FIG. 5, the structure and operation of the switching control circuit 13 are the same as those in the embodiment of FIG. 3. The difference between the embodiment in FIG. 5 and the embodiment in FIG. 3 is that the control switching circuit 12 in FIG. 5 comprises a current detector 50, a comparator 51, and a signal generation circuit 52. The current detector 50 is coupled to the inductor 113 at the node N12 to detect the inductor current $I_L$. In detail, the current detector 50 is connected in parallel with the PMOS transistor MP of the high-side switch 111 to detect the drain voltage $V_D$ and the source voltage $V_S$ of the PMOS transistor MP. The current detector 50 obtains the inductor current $I_L$ according to the drain-source voltage difference between the detected drain voltage $V_D$ and the source voltage $V_S$, thereby accomplishing the detection of the inductor current $I_L$. Since the drain-source voltage difference is related to the inductor current $I_L$, the drain voltage $V_D$ and the source voltage $V_S$ can represent the state of the inductor current $I_L$. In the embodiment, the switching control signal 12 receives the drain voltage $V_D$ and the source voltage $V_S$ as the current state signal $S_{IL}$. The current detector 50 generates a detection voltage V50 according to the magnitude of the above-mentioned drain-source voltage difference. Therefore, the detection voltage V50 which is obtained based on the drain voltage $V_D$ and the source voltage $V_S$ can represent the magnitude of the inductor current $I_L$. The comparator 51 is coupled to the current detector 50 to receive the detection voltage V50 and compares the detection voltage V50 with a threshold voltage $V_{TH}$. The threshold voltage $V_{TH}$ corresponds to the threshold current value of the inductor current $I_L$. Whether the inductor current $I_L$ is less than the threshold current value is determined through comparing the detection voltage V50 and the threshold voltage $V_{TH}$. In the embodiment, the predetermined condition indicates that the detection voltage V50 (representing the magnitude of the inductor current $I_L$) is less than the threshold voltage $V_{TH}$ (that is, the inductor current $I_L$ is less than the threshold current value). The comparator 51 generates a control signal S51 according to the comparison result. The signal generation circuit 52 generates the switching signals SW10 and SW11, and determines whether the voltage levels of the switching signals SW10 and SW11 need to be changed according to the control signal S51 to enable a switching action of the switched-capacitor conversion circuit 10. In one case, when the comparison result obtained by the comparator 51 indicates that the detection voltage V50 is greater than the threshold voltage $V_{TH}$ (that is, the inductor current $I_L$ is greater than the threshold current value), the control signal S51 with a low voltage level is generated. At this time, the signal generation circuit 52 maintains the voltage levels of the switching signals SW10 and SW11, that is the voltage level of the switching signals SW10 and SW11 are not changed. In another case, when the comparison result obtained by the comparator 51 indicates that the detection voltage V50 is less than the threshold voltage $V_{TH}$, the control signal S51 with a high voltage level is generated. At this time, the signal generation circuit 52 changes the voltage levels of the switching signals SW10 and SW11 to enable a switching action of the switched-capacitor conversion circuit 10.

Based on the above embodiments, the switching control circuit 13 controls the second-stage inductor buck circuit 11 in a constant on-time manner, instead of the manner for limiting an inductor current of a traditional hybrid power converter. Therefore, the switching control circuit 13 can be implemented by a relatively simple circuit design, which reduces the quiescent current. Therefore, in a case of light load or ultralight load, the efficiency of the power converter 1 is improved due to the lower quiescent current. Moreover, when a constant on-time manner is used to control the inductor buck circuit 11, the switching control circuit 12 can enable a switching action of the switched-capacitor conversion circuit 10 when the state of the inductor current $I_L$ corresponds to or meets the above-mentioned predetermined condition. In other embodiments, the switching control circuit 12 can enable a switching action of the switched-capacitor conversion circuit 10 when the power converter 1 enters a critical current mode from a discontinuous current mode.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power converter comprising:
   a switched-capacitor conversion circuit receiving an input voltage at an input terminal and performing a switching operation to convert the input voltage into an intermediate voltage; and
   an inductor buck circuit coupled to an output terminal of the switched-capacitor conversion circuit to receive the intermediate voltage and operating under a constant on-time to generate an output voltage at a conversion output terminal according to the intermediate voltage,
   wherein the inductor buck circuit comprises an inductor, and
   wherein in response to that a state of an inductor current used for charging the inductor corresponds to a predetermined condition, a switching action of the switching operation is enabled, so that the switched-capacitor conversion circuit is switched from a first turned-on state to a second turned-on state.

2. The power converter as claimed in claim 1, wherein the switched-capacitor conversion circuit comprises:
   a capacitor coupled between a first node and a second node;
   a first switch set coupled in series with the capacitor between the input terminal and the output terminal of the switched-capacitor conversion circuit; and
   a second switch set coupled in series with the capacitor between a ground terminal and the output terminal of the switched-capacitor conversion circuit,
   wherein in response to that the switched-capacitor conversion circuit is in the first turned-on state, one of the first switch set and the second switch set is turned on, and
   wherein in response to that the switched-capacitor conversion circuit is in the second turned-on state, the other of the first switch set and the second switch set is turned on.

3. The power converter as claimed in claim 1, wherein the predetermined condition indicates that the power converter enters a critical current mode from a discontinuous current mode.

4. The power converter as claimed in claim 1, wherein the inductor buck circuit comprises a high-side switch and an inductor which are in series between the output terminal of the switched-capacitor conversion circuit and the conversion output terminal, and the power converter further comprises:
- a constant on-time control circuit providing a constant time period and generating a switching signal according to the constant time period to control the high-side switch,
- wherein, according to the switching signal, the high-side switch is turned on for a constant time during the constant time period.

5. The power converter as claimed in claim 4, further comprising a reset circuit for resetting the constant on-time control circuit to restart the constant time period, wherein the reset circuit comprises:
- a latch-type comparator receiving the output voltage and a reference voltage, comparing the output voltage with the reference voltage according to a clock signal, and generating a comparison result signal according to a comparison result of the output voltage and the reference voltage,
- wherein in response to that the output voltage is less than the reference voltage, a single pulse occurs on the comparison result signal to reset the constant on-time control circuit.

6. The power converter as claimed in claim 5, wherein a frequency of the clock signal is determined according to a load current flowing through a load of the power converter.

7. The power converter as claimed in claim 4, wherein the constant on-time control circuit comprises:
- a capacitor comprising a first terminal coupled to the constant current source at a first node and further comprising a second terminal coupled to a ground terminal, wherein a ramp voltage is generated at the first node; and
- a buffer circuit comprising an input terminal coupled to the first node to receive the ramp voltage and further comprising an output terminal generating a switching signal,
- wherein, the high-side switch is controlled by the switching signal, and
- wherein, the inductor buck circuit further comprises a low-side switch coupled between the conversion output terminal and the ground terminal.

8. The power converter as claimed in claim 1, wherein the predetermined condition indicates that a number of peaks occurring on the inductor current within a predetermined time is equal to a predetermined number, or the inductor current is less than a threshold current value.

9. The power converter as claimed in claim 8, further comprising:
- a latch-type comparator receiving the output voltage and a reference voltage, comparing the output voltage with the reference voltage, and generating a comparison result signal according to a comparison result of the output voltage and the reference voltage, wherein, whenever the output voltage is less than the reference voltage, a single pulse occurs on the comparison result signal, and each single pulse of the comparison result signal corresponds to one peak of the inductor current; and
- a determination circuit receiving the comparison result signal and counting a number of single pulses on the comparison result signal within the predetermined time according to a clock signal to obtain a count value,
- wherein the determining circuit determines whether the count value is greater than the predetermined number to generate a control signal to the switched-capacitor conversion circuit, and
- wherein in response to the determination circuit determining that the count value is greater than the predetermined number, a switching action of the switched-capacitor conversion circuit is enabled according to the control signal.

10. The power converter as claimed in claim 8, further comprising:
- a current detector detecting the inductor current to generate a detection voltage; and
- a comparator receiving the detection voltage, compares the detection voltage with a threshold voltage, and generates a control signal according to a comparison result of the detection voltage and the threshold voltage, wherein the control signal is provided to the switched-capacitor conversion circuit,
- wherein in response to the comparison result indicating that the detection voltage is less than the threshold voltage, a switching action of the switched-capacitor conversion circuit is enabled according to the control signal.

* * * * *